United States Patent [19]
Kirkeby et al.

[11] Patent Number: 5,471,042
[45] Date of Patent: Nov. 28, 1995

[54] HANDHELD DATA ENTRY TERMINAL HAVING DUAL TRIGGER SWITCHES

[75] Inventors: David Kirkeby, Fullerton, Calif.; Boris Metlitsky, Stony Brook, N.Y.; Mark Krichever, Hauppauge, N.Y.; Jerome Swartz, Old Field, N.Y.

[73] Assignee: Symbol Technologies, Inc., Bohemia, N.Y.

[21] Appl. No.: 153,443

[22] Filed: Nov. 17, 1993

Related U.S. Application Data

[63] Continuation-in-part of Ser. No. 79,761, Jun. 21, 1993, abandoned, which is a continuation-in-part of Ser. No. 881,280, May 11, 1992, Pat. No. 5,306,900, which is a continuation-in-part of Ser. No. 193,265, May 11, 1988, Pat. No. 5,144,120.

[51] Int. Cl.⁶ .................................................. G06K 7/10
[52] U.S. Cl. ............................................ 235/472; 235/462
[58] Field of Search ................................... 235/462, 467, 235/472; 341/20, 22, 23; 361/679, 680; 345/163, 168, 169; 400/476

[56] References Cited

U.S. PATENT DOCUMENTS

| | | | |
|---|---|---|---|
| D. 340,237 | 10/1993 | Swartz | D14/116 |
| D. 340,707 | 10/1993 | Swartz | D14/116 |
| 4,387,297 | 6/1983 | Swartz et al. . | |
| 4,460,120 | 7/1984 | Shepard et al. . | |
| 4,806,742 | 2/1989 | Swartz et al. . | |
| 4,816,661 | 3/1989 | Krichever et al. . | |
| 4,845,350 | 7/1989 | Shepard et al. . | |
| 4,916,441 | 4/1990 | Gombrich | 340/712 |
| 4,983,818 | 1/1991 | Knowles | 235/472 |
| 5,144,120 | 9/1992 | Krichever et al. . | |
| 5,241,488 | 8/1993 | Chadima, Jr. et al. | 364/708.1 |
| 5,313,053 | 5/1994 | Koenck et al. | 235/472 |
| 5,324,925 | 6/1994 | Koenck et al. | 235/472 |

FOREIGN PATENT DOCUMENTS

| | | | |
|---|---|---|---|
| 62-147578 | 7/1987 | Japan | 235/472 |
| 4-149790 | 5/1992 | Japan | 235/472 |
| 90/16033 | 12/1990 | WIPO . | |

*Primary Examiner*—Karl D. Frech
*Attorney, Agent, or Firm*—Finnegan, Henderson, Farabow, Garrett & Dunner

[57] ABSTRACT

A handheld data entry terminal includes a housing and a scanning head mounted to the housing for pivotal movement between at least first and second reading positions. The scanning head, when actuated, optically scans an encoded symbol and detects light reflected from the encoded symbol while in either of the first and second reading positions. As desired, a terminal user can establish either one of first and second trigger switches mounted to the housing as a scanning head actuating switch, leaving the other of the trigger switches to be established as a shift key for determining the type of characters entered by alphanumeric data entry keys of a keypad also mounted to the housing in conjunction with an LCD display.

16 Claims, 6 Drawing Sheets

HANDHELD DATA ENTRY TERMINAL HAVING DUAL TRIGGER SWITCHES

The present invention is a continuation-in-part of U.S. patent application Ser. No. 08/079,761, filed Jun. 21, 1993, now abandoned which is a continuation-in-part of U.S. patent application Ser. No. 07/881,280, filed May 11, 1992, now U.S. Pat. No. 5,306,900 which in turn is a continuation-in-part of U.S. patent application Ser. No. 07/193,265, filed May 11, 1988, now U.S. Pat. No. 5,144,120; the disclosures of which are incorporated herein by reference.

BACKGROUND OF THE INVENTION

1. Field of the Invention

The present invention relates to electro-optical systems for reading indicia of different light reflectivity, such as bar code symbols. In particular, the present invention to a handheld data entry terminal of improved ergonomic design.

2. Description of Related Prior Art

Related to the handheld data entry terminal of the present invention are the laser scanner systems and components disclosed in U.S. Pat. Nos. 4,387,297; 4,460,120; 4,816,661; 4,806,742; and 4,845,350, as well as U.S. patent applications Ser. Nos. 07/148,669, 07/147,708 and 08/061,070. All of these patents and patent applications are owned by the assignee of the present invention and are incorporated herein by reference.

As exemplified in the cited related art, a light source, such as a laser, generates a light beam which is directed by optical components along a light path toward a bar code symbol. The laser light beam is repetitively scanned by a scanning component, such as an oscillating mirror situated in the beam path, to sweep a beam spot beam across the bar code symbol. A photodetector detects light of variable intensity reflected or scattered from the symbol and generates electrical signals indicative of the detected light. These electrical signals are decoded and into data representative of the data encoded in the symbol.

Barcode scanner terminals are basically of two types, the fixed installation type exemplified by the scanners incorporated in supermarket checkout counters and the portable type. The portable type is particularly advantageous in situations where articles bearing the barcode symbols cannot, from a practical standpoint, be brought to a fixed scanner terminal to enter the barcode data. Thus, for example, handheld barcode scanners are particularly advantageous to inventory stock distributed throughout a store, warehouse, etc.

Known handheld barcode scanners have taken a variety of shapes. A pistol shape has been a popular configuration due to the inherent ease in aiming the laser beam at a target barcode symbol. Unfortunately, a pistol-shaped scanner is not particularly conducive to the inclusion of other desirable features, such as a data entry keypad and an output device, such as a liquid crystal display (LCD). Also, it is very difficult to design an ergonomic, portable barcode scanner and keypad data entry terminal that is convenient to use by both left and right-handed operators.

SUMMARY OF THE INVENTION

Accordingly, the present invention is directed to a handheld data entry terminal that effectively obviates the limitations and disadvantages of known portable data entry terminals.

In accordance with the present invention, as embodied and broadly described, the present invention provides a handheld data entry terminal having a housing and a scanning head mounted to the housing for pivotal movement between at least first and second reading positions. The scanning head contains components, when actuated, for optically scanning an encoded symbol and for detecting light reflected from the encoded symbol while the scanning head is in either of the first and second reading positions.

The invention further includes first and second trigger switches, mounted by the housing, and conversion means selectively conditioned by the user to establish either of the first and second trigger switches as a scanning head actuating switch, regardless of which reading position the scanning head is position to.

In another aspect of the present invention, the handheld data entry terminal further includes a keypad for entering alphanumeric data and a display for displaying keypad entered data. In addition, the scanning means is further adapted to utilize the one of the first and second trigger switches, that is not established as the scanning head actuating switch, as a keypad shift key for controlling the type of characters entered by depression of character entry keys of the keypad.

According to a further aspect of the present invention, the handheld data entry terminal includes a swivel mount connecting the scanning head to the housing, such as to permit the scanning head to be rotated between the first and second reading positions. The swivel mount includes a bushing affixed to the housing and including a pair of diametrically opposed detent slots interconnected by a semicircular track, a spring acting between the bushing and a scanning head to bias the scanning head into juxtaposition with the housing, and a tab carried by the scanning head for engagement in one or the other of the detent slots when the scanning head is in either of the first and second reading positions, with the tab moving through the semicircular track when the scanning head is being swivelled between the first and second reading positions.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description serve to explain the principals of the invention.

DESCRIPTION OF THE PREFERRED EMBODIMENT

Figure 1:
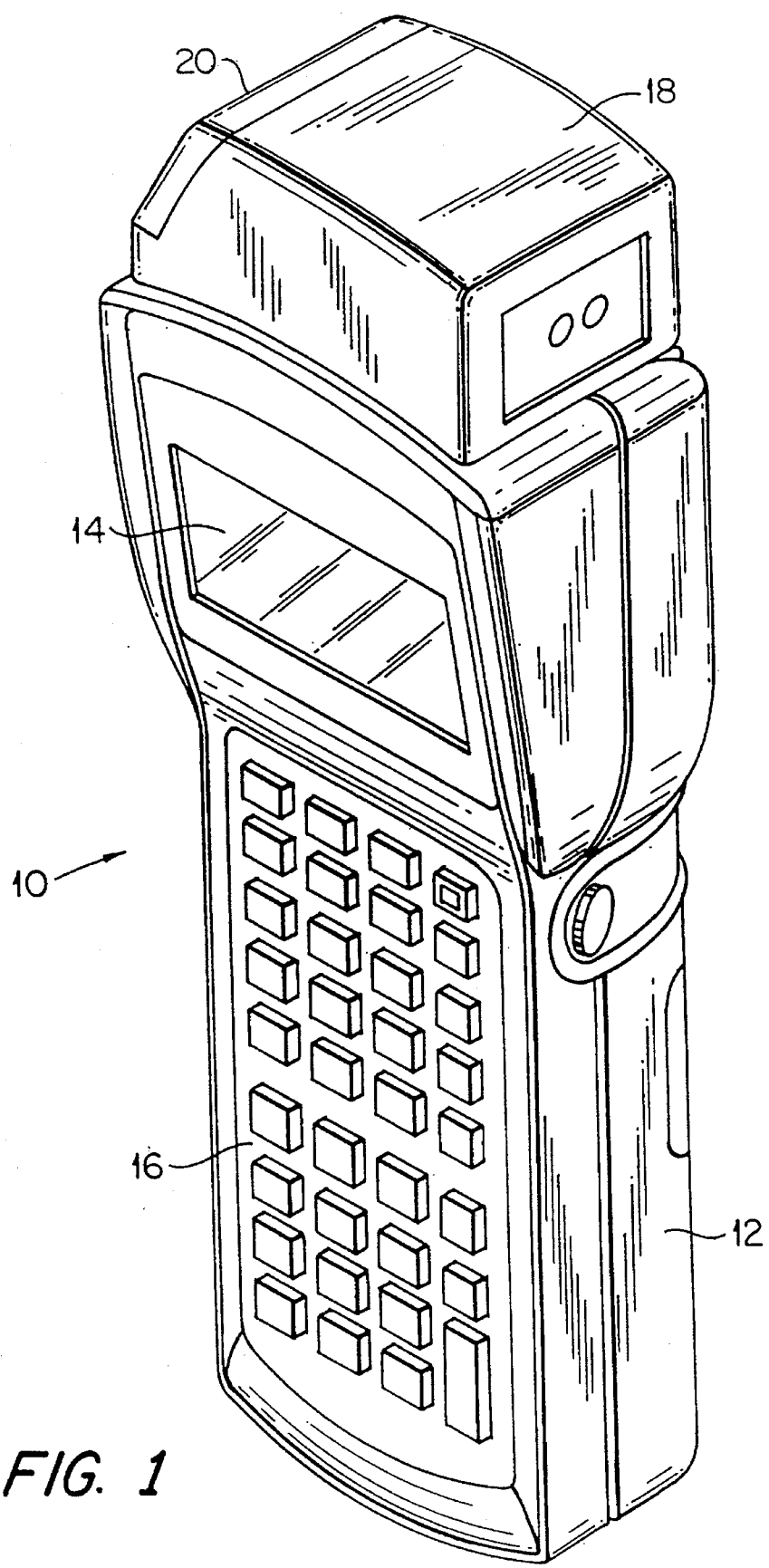
FIG. 1 is a perspective view of a handheld data entry terminal embodying the present invention.

Reference will now be made in detail to the present preferred embodiment of the invention, an example of which is illustrated in the accompanying drawings. Where ever possible, the same reference numerals will be used throughout the drawing to refer to the same or like parts.

Figure 2:
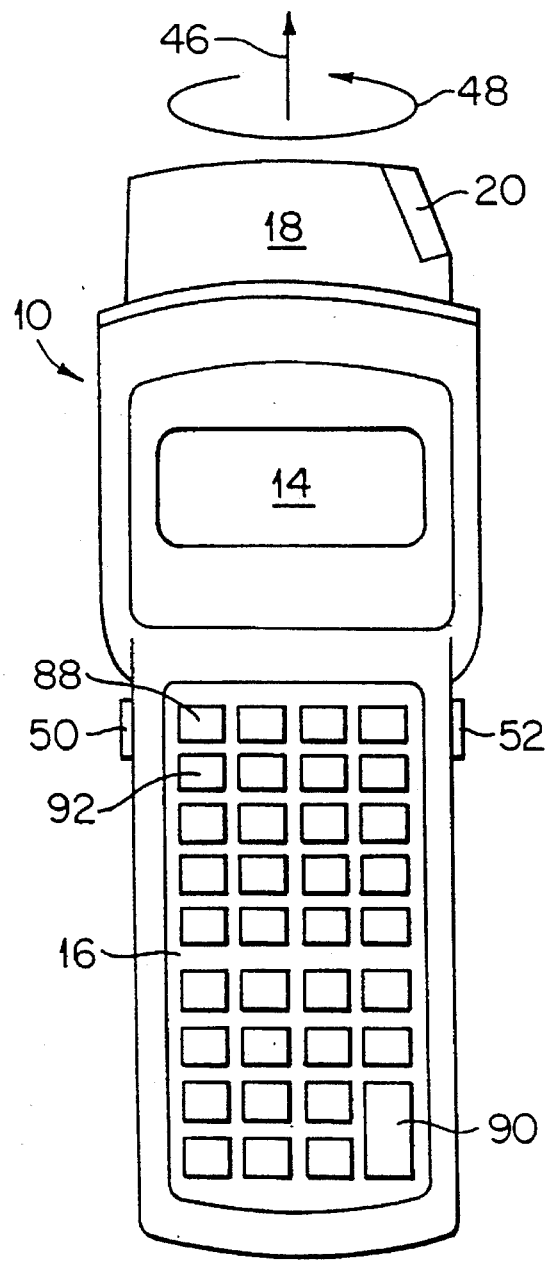
FIG. 2 is a front view of the handheld data entry terminal of FIG. 1.
Figure 3:
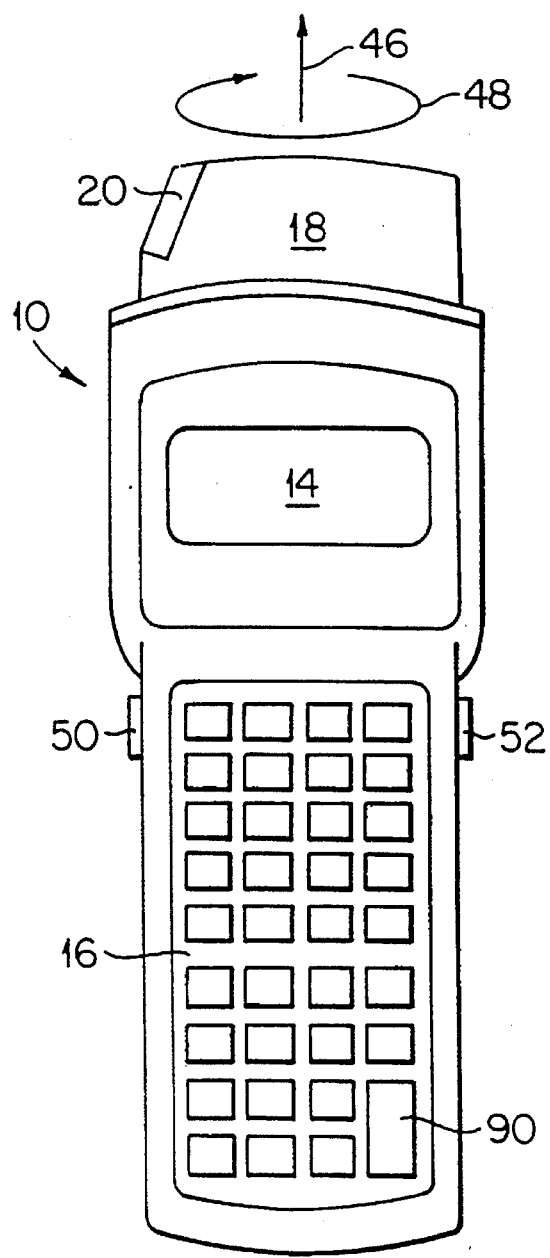
FIG. 3 is another front view of the handheld data entry terminal of FIG. 1, illustrating a different scanning head reading position.

FIGS. 1–3 illustrate a handheld data entry terminal, constructed in accordance with the present invention and generally indicated at 10, in its application to optically reading data-encoded symbols such as barcode symbols. As used in this specification and the following claims, the term "symbol"to is intended to be broadly construed to cover not only data-encoded symbol patterns composed of alternating bars and spaces, but also other patterns having elements of different light reflectivity, such as printed alphanumeric characters.

In accordance with the present invention, handheld data entry terminal 10 includes housing 12, rectangular in cross section and sized for comfortable griping by either hand. Housing 12 incorporates, on a front side or face, an output device such as a liquid crystal display (LCD 14) and a keypad 16 including a plurality of keys for entering alphanumeric data into the terminal. Mounted atop housing 12 is a scanning head 18 containing an optical scan module for emitting light beam which passes through a window 20 in the front end of the scanning head. This light beam is directed to scan a beam spot across an encoded symbol (not shown), and light reflected from the symbol returns to the scanning head through window 20.

In accordance with a feature of the present invention, scanning head 18 is pivotally connected to housing 12 by a swivel mount permitting the scanning head to be rotated between a first reading position, illustrated in FIG. 2, and a second reading position, illustrated in FIG. 3. Thus, scanning head 18 may assume the reading position of FIG. 2, wherein window 20 of scanning head 18 faces rightward, or the reading position of FIG. 3, wherein the window 20 faces leftward of terminal 10. As can be readily appreciated, this ergonomic flexibility of scanning head positions affords comfortable and convenient handheld use of terminal 10 by either the left or right hand of an operator.

Figures 4, 5:
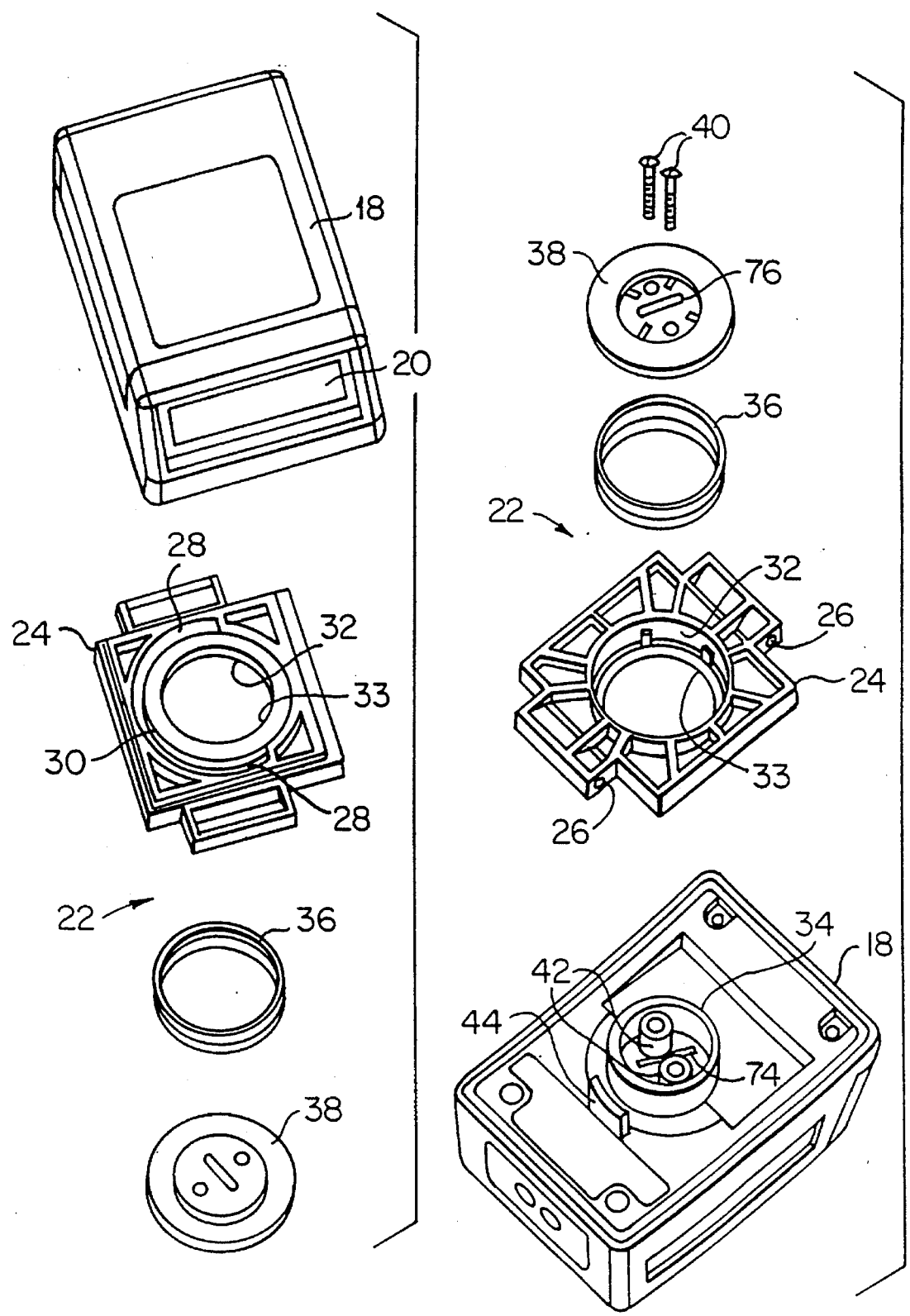
FIGS. 4 and 5 are exploded assembly views, in perspective, of a scanning head swivel amount utilized in the handheld data entry terminal of FIG. 1.

As illustrated in FIGS. 4 and 5, this swivel mount, generally indicated at 22, includes a bushing 24 affixed in a top opening (not shown) in housing 12 by suitable fasteners, such as screws engaged in screws holes 26 (FIG. 5). Bushing 24 is formed with a pair of diametrically opposed detent slots 28 interconnected by a semicircular track 30 (FIG. 4). Bushing 24 is also formed with a central walled opening 32 which receives a collar 34 depending from the underside of scanning head 18 when the scanning head is assembled to housing 12. Center opening 32 includes an inwardly projecting rim 33 which provides an annular bearing surface for collar 34, such as to effectively journal the scanning head 18 for rotational movement between reading positions.

To complete the swivel mount assembly, a compression spring 36 is positioned in an annular cavity between the wall of opening 32 and collar 34 and is held in compression by a retainer 38 affixed to scanning head 18 by suitable fasteners, such a screws 40, engaged in screw holes formed in bosses 42 projecting from the underside of the scanning head. To detain scanning head in either of its reading positions seen in FIGS. 4 and 5, a tab 44 (FIG. 5), depending from the underside of scanning head 18 is seated in either one or the other of the diametrically opposed slots 28 (FIG. 4) in bushing 24. This detent seating is maintained by compression spring 36 which biases scanning head 18 into engagement with the top surface of housing 12.

To rotate scanning head 18 from one reading position to the other, an operator grasps the scanning head and pulls it away from the housing 12 against the force of spring 36. This action, indicated by arrow 46 in FIGS. 2 and 3, draws tab 44 out of one of the detent slots 28. The operator then twists the scanning head 18 to position it to the other reading position, where tab 44 drops into the other detent slot 28 under the bias of spring 36. During rotation of the scanning head 18, indicated by arrow 48 in FIGS. 2 and 3, tab 44 runs in track 30 to maintain the detent-released condition of scanning head 18.

In accordance with another feature of the present invention, terminal 10 incorporates a pair of trigger switches 50 and 52 located on opposite sides of the housing 12. Thus, as seen in FIGS. 2 and 3, figure switch 50 is located on the left side of housing 12, while trigger switch 52 is located on the right side of the housing. In the interest of ergonomic design, terminal 10 is conveniently adaptable to establish either ,one of these trigger switches 50, 52 as the actuating switch for scanner head 18, regardless of which reading position the scanning head is positioned to. Thus, depending upon operator preference, either of the trigger switches 50, 52 maybe established to actuate scanning head 18 by depression using either the thumb or forefinger of either hand.

Figure 6:
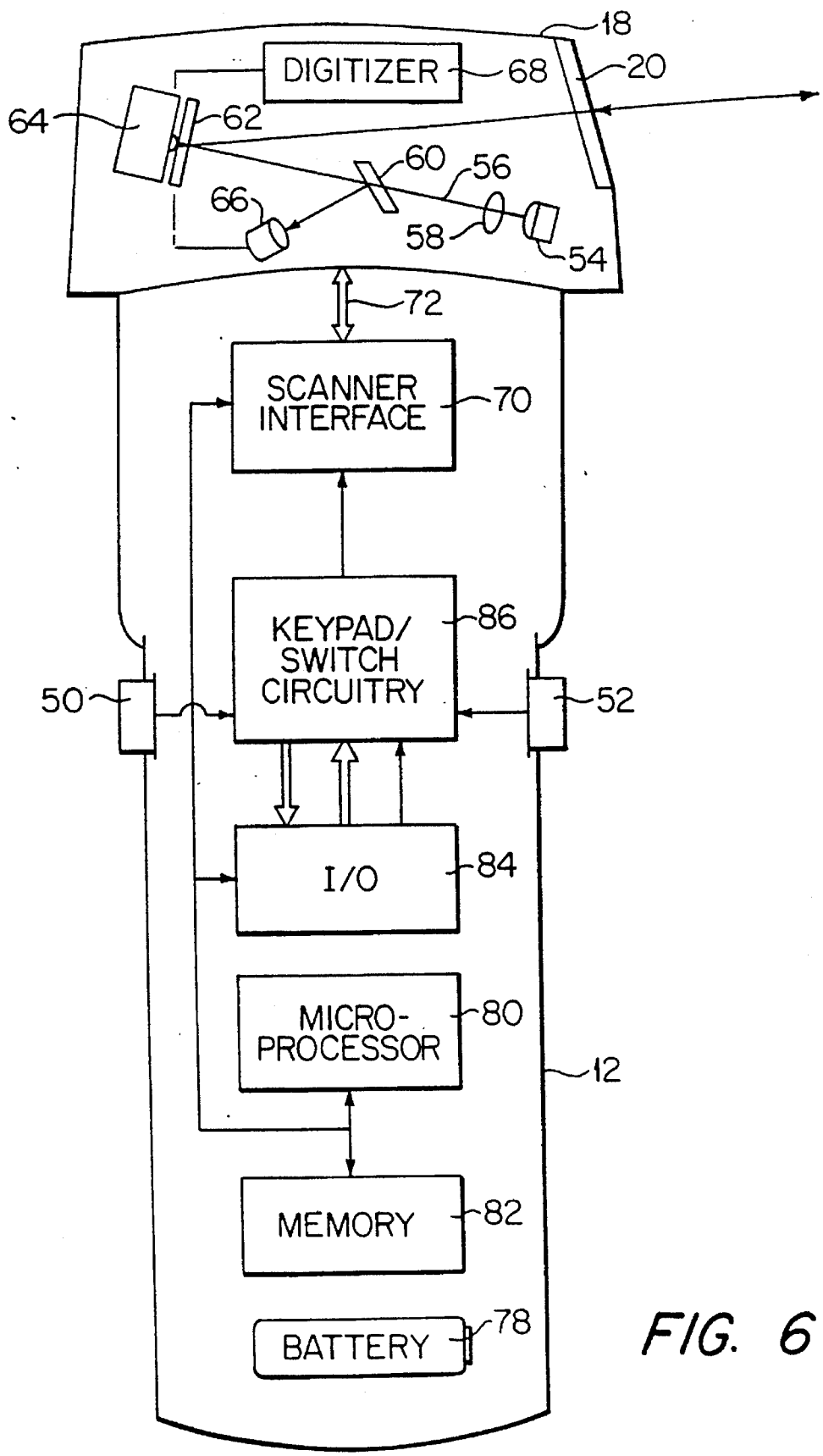
FIG. 6 is a schematic block diagram of the basic operative components included in the handheld data entry terminal of FIG. 1.

To describe how these ergonomic design features are achieved in accordance with the present invention, reference will now be made to FIGS. 6 and 7 which illustrate operative components contained by housing 12 and scanning head 18. As seen in FIG. 6, scanning head 18 contains a suitable source 54, such as a laser diode, for generating a laser beam 56. The laser light beam is focused by a lens 58 before passing through a beam splitter 60 and then is reflected by a mirror 62 as an outgoing symbol reading beam which passes through window 20 toward a symbol under the aim of the operator. Mirror 62 is oscillated by a motor 64, such that a beam spot is repetitively scanned across the coded symbol elements. Embodiments of suitable oscillating mirror modules are disclosed in the above-cited U.S. patent application Ser. No. 08/061,070, filed May 14, 1993. Light reflected from the symbol returns to scanning head 18 generally along the path of the outgoing symbol reading beam and is redirected by beam splitter 60 to a photodetector 66. The light signals are converted to analog electrical signals which are then converted to binary signals by a digitizer 68. These binary signals from digitizer 68, representative of the symbol encoded data, are transmitted to a scanner interface contained in housing 12 via a ribbon cable 72, which passes through aligned slits 74 and 76 in the underside of scanning 18 and retainer 38, respectively (FIG. 5). Ribbon cable 72 also carries status and controls signals between scanning head 18 and scanner interface 70, as well as scanning head actuating power via the established one of the trigger switches 50, 52.

Still referring to FIG. 6, housing 12 also contains a battery pack 78 to power a microprocessor 80, a memory 82, input/output circuitry 84, the keypad 16 via keypad/switch circuitry 86 and scanner interface 70, as well as scanning head 18. Microprocessor 80, is programmed to process the digitized symbol data received from digitizer 68 via scanner interface 70 and keypad data entries received via keypad/ switch circuitry 86 and I/O circuitry 84. The data processed by microprocessor 80 is stored in memory 82 for subsequent retrieval by a data acquisition computer (not shown). The microprocessor exchanges status and control signals with scanning head 18 via scanner interface 70.

Included among the keys of keypad 16 is an alpha key, indicated at 88 in FIG. 2, which serves as a keypad shift key for toggling the keypad between alphabetic and numeric/ symbol entry modes. In response to momentary depression of alpha key 88, microprocessor 80 switches keypad 16 between the alphabetic mode, wherein depressions of character entry keys enter alphabetic characters into terminal 10, and the numeric mode, wherein depressions of the same character entry keys enter numeric or symbol characters into the terminal. All keypad entries are displayed by display 14 and then entered into microprocessor 80 for processing upon depression of an enter key indicated at 90 in FIG. 2. Keypad 16 also includes a function key indicated at 92 in FIG. 2, which is used to establish which one of the trigger switches 50, 52 is to function as the actuating switch for scanning head 18. Specifically, to select a scanning head actuating switch, the operator depresses function key 92 and then depresses one of the trigger switches 50, 52 desired to serve as the scanning head actuating switch. Microprocessor 80 is programmed to establish trigger switch 50 as the scanning head actuating switch if it is depressed immediately following a depression of function key 92. On the other hand, microprocessor 80 establishes trigger switch 52 as the scanning head actuating switch if it is depressed following a depression of function key 92. When a symbol is to be read, the operator simply depresses the established one of the trigger switches 50, 52 to actuate laser diode 50 and scanner motor 64 thereby generating symbol reading beam 56 during the period of trigger switch depression.

As also illustrated in FIG. 6, the ergonomic design of terminal 10 may also include enlarging scanning head 18 such that it is of a larger lateral cross-section than the top surface of housing 12.

Figure 7:
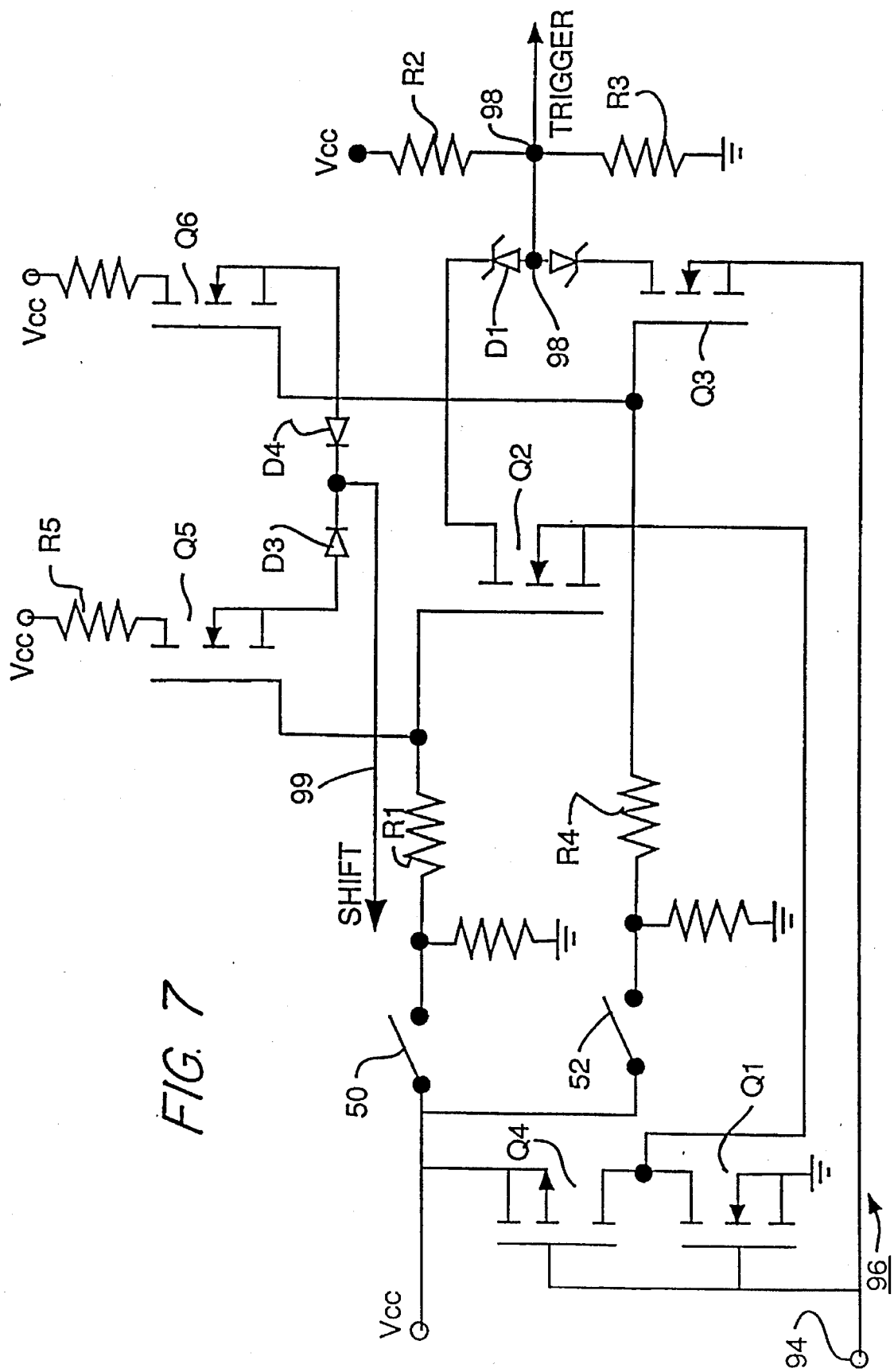
FIG. 7 is a schematic diagram of a switching logic circuit utilized in controlling the operation of the handheld data entry terminal of FIG. 1.

Turning to FIG. 7, depending upon which of the trigger switches 50, 52 is established as the scanning head actuating switch, microprocessor imposes either a high or low voltage level at a terminal 94 of a switch logic circuit generally, indicated at 96 and included in keypad/switch circuitry 86 (FIG. 6). Specifically, microprocessor 80 sets a high voltage level at terminal 94 to establish, for example, trigger switch 50 as the scanning head actuating switch. Conversely, to establish trigger switch 52 as the scanning head actuating switch, microprocessor 80 sets terminal 94 to a lower voltage level.

When microprocessor 80 sets terminal 94 to a high voltage level, transistor Q1 is rendered conductive to impose ground potential on the source of transistor Q2. Consequently, when trigger switch 50 is closed, the high voltage level of a supply Vcc is applied through resister R1 to the gate of transistor Q2 which then turns on. As a result, junction 98 between resistors R2 and R3 connecting supply voltage Vcc to ground, which normally resides at a high voltage level, is pulled down to a low voltage level through zener diode D1 and conducting transistors Q2 and Q1. Thus, as long as trigger switch 50 is closed, a low level voltage signal TRIGGER is transmitted via keypad/switch circuitry 86, scanner interface 70, and ribbon cable 72 to actuate scanner head 18. Note that as long as trigger switch 50 is the established scanning head actuating switch, closure of trigger switch 52 cannot actuate scanning head 18 since the high voltage at terminal 94, which is applied to the source of a transistor Q3, holds this transistor in a non-conductive state even when a high voltage is applied to its gate by closure of trigger switch 52.

However, when trigger switch 52 is established as the scanning head actuating switch, microprocessor 80 imposes a low voltage level on terminal 94 of switch logic circuit 96. As a result, transistor Q1 is held non-conductive, while transistor Q4 is turned on to impose the high voltage of supply Vcc on the source of transistor Q2. Consequently, trigger switch 50 is disabled from turning on transistor Q2. However, since the low voltage level at terminal 94 is directly applied to the source of transistor Q3, closure of trigger switch 52 applies the supply voltage Vcc to the gate of this transistor through resistor R4, and transistor Q3 turns on. As a result, junction 98 is pulled toward the low voltage level of terminal 94 though zener diode D2 and conducting transistor Q3. The TRIGGER signal is thus generated to actuate scanning switch 18 as long a trigger switch 52 is depressed to a closed state.

In accordance with another feature of the present invention, the trigger switch 50, 52 that is not established as the scanning head actuating switch is utilized as a keypad shift key for shifting keypad 16 from the alpha/numeric character entry mode set by alpha key 88 to the other alpha/numeric entry mode. Thus, as also seen in FIG. 7, trigger switch 50 is connected to the gate of a transistor Q5 through resistor R1, while trigger switch 52 is connected to the gate of transistor Q6 through resistor R4. Consequently, closure of trigger switch 50 turns transistor Q5 on to apply the high voltage of supply voltage Vcc as a SHIFT signal onto line 99 through resistor R5, and transistor Q5, and diode D3. Also, closure of trigger switch 52 turns transistor Q6 on to apply the high voltage of supply voltage Vcc onto lead 99 through resistor R6, transistor Q6, and diode D4 as a keypad entry mode SHIFT signal. Since microprocessor 80 establishes which one of the trigger switches 50, 52 is to function as the scanner head actuating switch via the voltage signal level imposed on terminal 94, microprocessor 80 can interpret a valid keypad shift signal generated by the other of the trigger switches by logically combining the TRIGGER and SHIFT signals. Thus, keypad 16 is shifted from the one alphanumeric entry modes set by alpha key 88 to the other alphanumeric character entry mode as long as the trigger switch that is not the scanner head actuating switch is depressed.

Figure 9:
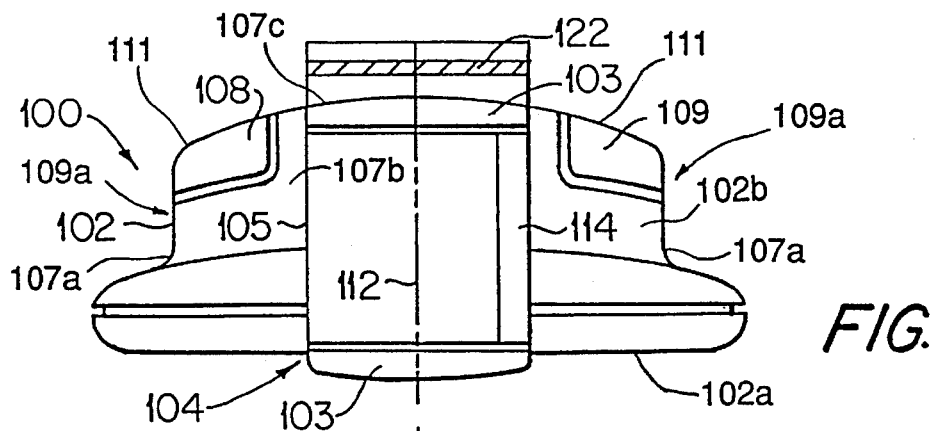
FIG. 9 is a top view of the handheld data entry terminal of FIG. 8.
Figure 8:
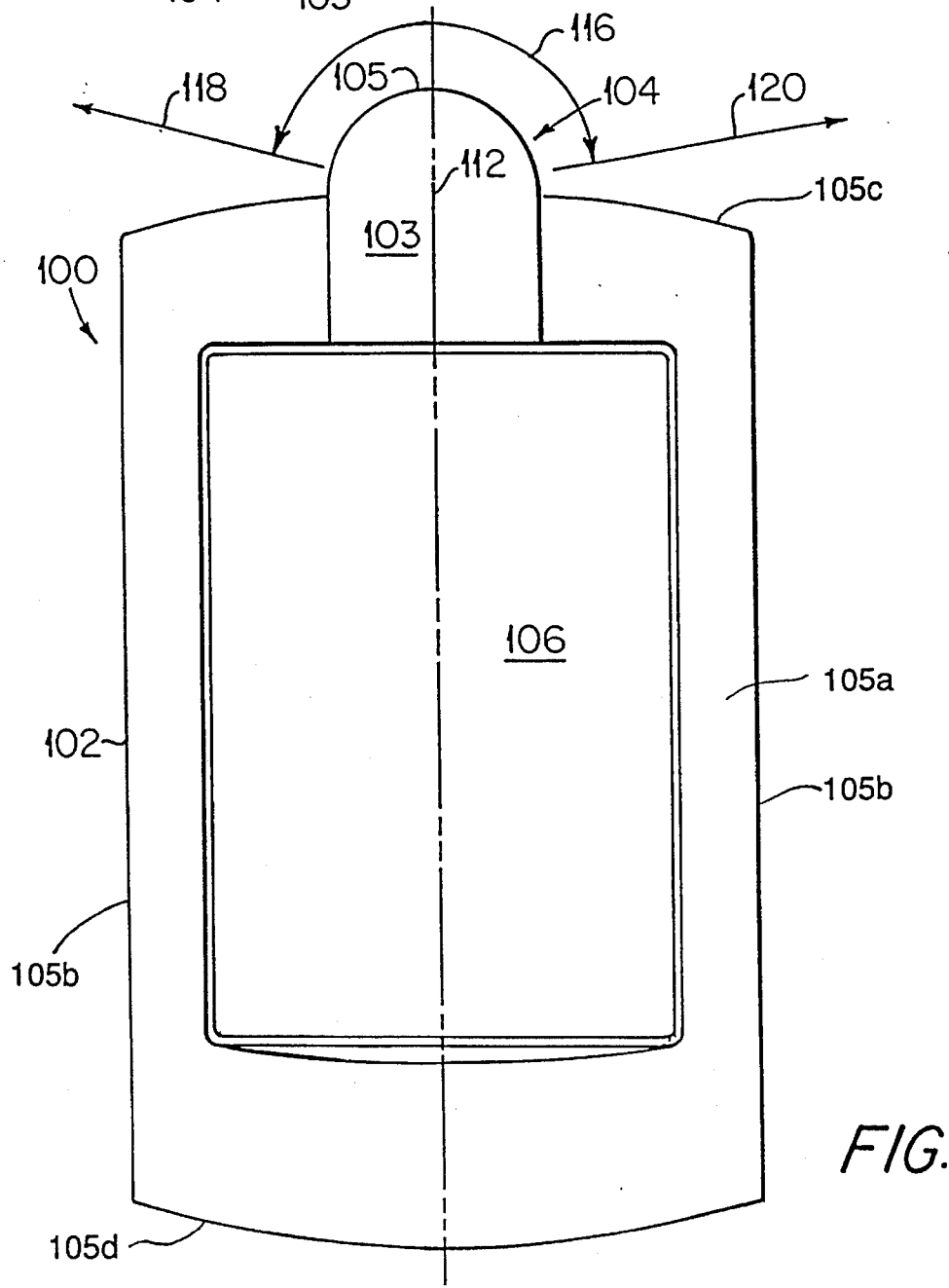
FIG. 8 is a front view of a handheld data entry terminal constructed in accordance with an alternative embodiment of the present invention.

In the embodiment of the invention seen in FIGS. 8 and 9, a data entry terminal 100 includes a handheld housing 102 mounting a movable scanning head 104 and incorporating a frontal touch-sensitive display 106 whereby data can be entered and the terminal reconfigured for handheld use in either hand by touching appropriate locations on the display screen. The housing also mounts trigger switches 108 and 110, either one of which can be established as the scanning head actuating switch according to the terminal configuration set by the user. More specifically and as seen in FIGS. 8 and 9, housing 102 is formed having a frontal portion 102a and a rear portion 102b; the frontal portion having a more shallow depth than the rear portion. The frontal housing portion 102a includes a generally planar front side 105a bounded by opposed side edges 105b, a top edge 105c, and a bottom edge 105 d. Touch-sensitive display 106 is provided at the front side 105a of the frontal housing portion 102a. The rear housing portion 102b includes opposed side walls 107a, a top wall 107b and a rearwardly bowed backwall 107 c in conjoined relation, with the side and top walls of the rear housing portion in conjoined relation with the frontal housing portion and in set back relation (generally indicated at 109a in FIG. 9) with the side edges 105b and top edge 105c, respectively, of the frontal housing portion. Trigger switches 108 and 109 are located at respective shoulder regions 111, where each side wall 107a conjoins with top wall 107b and backwall 107c of the rear housing portion 102b. The trigger switches are thus positioned at locations convenient for actuation by thumb and forefinger of the user's hand while gripping the rear housing portion 102b of terminal 100.

Scanning head 104 is in the form of a cylinder, indicated at 105, and is mounted between fixed end pieces 103 of housing 102 for rotation about an axis 112, seen in FIG. 9. Incorporated in the cylindrical surface of scanning head 104 is a rectangular window 114. Rotation of the scanning head 104 through an arc 116 swings window 114 between two extreme reading positions, one indicated by symbol scanning beam 118 and the other by symbol scanning beam 120. As indicated in cross-section, a hand strap 122 may be attached to the back of housing 102 to accept the user's hand while holding the terminal.

It is thus seen that the present invention provides a versatile, handheld data entry terminal 10 accommodating data entries read from encoded barcode symbols and from integrated keypad 16. The ergonomic features of the present invention enable the user to operate all of the data entry capabilities of terminal 10 while grasping housing 12 in either hand and depressing trigger switches 50, 52 with either the thumb or forefinger of the grasping hand, leaving the other hand free for keypad data entries. After an extended period of use, the operator can readily reconfigure terminal 10 to relieve operator fatigue and mitigate incidences of carpal tunnel syndrome due to prolonged, repetitive finger motions.

Since modifications of the present invention will be apparent to those skilled in the art from consideration of the specification and practice of the invention as disclosed herein, it is intended that the specification and drawings be considered as exemplary only, with the true scope and spirit of the invention being indicated by the following claims.

We claim:

1. A handheld data entry terminal comprising:
   a housing;
   a scanning head mounted to the housing for pivotal movement between at least first and second reading positions, the scanning head containing components, when actuated, for optically scanning an encoded symbol and for detecting light reflected from the encoded symbol while the scanning head is in either of the first and second reading positions;
   first and second trigger switches mounted by the housing; and
   conversion means selectively conditioned by a user for disabling the second trigger switch from actuating the scanning head components and enabling the first trigger switch to actuate the scanning head components when the scanning head is positioned in the first reading position and for disabling the first trigger switch from actuating the scanning head components and enabling the second trigger switch to actuate the scanning head components when the scanning head is positioned in the second position.

2. The handheld data entry terminal of claim 1, wherein the housing contains a battery power source for energizing the scanner head components under the control of the enabled one of the first and second trigger switches.

3. The handheld data entry terminal of claim 1, which further includes a keypad mounted by the housing and including a plurality of keys for entering alphanumeric data, and wherein the conversion means includes means for conditioning the keypad such that one of the first and second trigger switches selectively controls the type of characters entered by depression of the keypad keys while the other of the first and second trigger switches actuates the scanning head components.

4. The handheld data entry terminal of claim 3, which further includes a display for displaying data keyed into the terminal by the keypad.

5. The handheld data entry terminal of claim 4, which further includes a microprocessor and a memory, the keypad including an enter key, whereby depression of the entry key effects entry of the displayed data for processing by the microprocessor and storage by the memory.

6. The handheld data entry terminal of claim 4, which further includes a microprocessor and a memory, the display being a touch-sensitive display, whereby touching the display effects entry of the displayed data for processing by the microprocessor and storage by the memory.

7. The handheld data entry terminal of claim 1, wherein the scanning head is mounted to an upper end of the housing and is dimensioned to have a larger lateral cross section than a cross section of the housing upper end.

8. A handheld data entry terminal comprising:
   a housing;
   a scanning head mounted to the housing for rotational movement between various reading positions, the scanner head containing components, when actuated, for optically scanning an encoded symbol and for detecting light reflected from the encoded symbol;
   first and second trigger switches mounted by the housing;
   data entry means mounted by the housing and including a function key; and
   logic means responsive to inputs generated by the function key and one of the first and second trigger switches that is actuated following actuation of the function key to establish the actuated one of the first and second trigger switches as a desired actuating switch for the scanning head components for a particular reading position to which the scanning head is positioned by an operator.

9. The handheld data entry terminal of claim 8, which further includes a display for displaying data entered by the keypad.

10. The handheld data entry terminal of claim 9, wherein the display is a touch-sensitive display.

11. A handheld data entry terminal comprising:
    a housing;
    a scanning head for optically reading an encoded signal when actuated;
    a swivel mount connecting the scanning head to one end of the housing, the swivel mount including:
       a bushing affixed to the one end of the housing, the bushing including a pair of diametrically opposed first and second detents interconnected by a semicircular track;
       a tab affixed to the scanning head; and
       a spring acting between the scanning head and the bushing to resiliently urge the tab into seating engagement in the first detent to releasably detain the scanning head in a first reading position and to resiliently urge the tab into seating engagement in the second detent to releasably detain the scanning head in a second reading position, the tab running in the semicircular track during rotation of the scanning head between the first and second reading position,
the swivel mount permitting rotational movement of the scanning head through an angle of substantially 180° between the first reading position pointing away from one side of the housing and the second reading position pointing away from an opposite side of the housing;

a first trigger switch mounted to the one side of the housing;

a second trigger switch mounted to the opposite side of the housing; and conversion means selectively conditioned by a user to establish either one of the first and second trigger switches as a scanning head actuating switch when the scanning head is positioned in either one of the first and second reading positions.

12. The handheld data entry terminal of claim 11, which further includes a keypad positioned at a front side of the housing and including a plurality of alphanumeric keys for entering alphanumeric data into the terminal.

13. The handheld data entry terminal of claim 12, which further includes a display for displaying the alphanumeric data entered by the keypad, the keypad positioned at the front side of the housing.

14. The handheld data entry terminal of claim 13, wherein the conversion means includes means for establishing the one of the first and second trigger switch that is not the established scanning head actuating switch as a keypad shift key for controlling the type of characters entered upon depression of the alphanumeric keys.

15. A handheld data entry terminal comprising:

a housing having a frontal portion and rear portion, the frontal portion being of a more shallow depth having a generally planar front side bounded by top and bottom edges and opposed side edges, a front end piece upstanding from the top edge of the frontal housing portion, the rear housing portion having opposed sidewalls, a topwall, a rear end piece upstanding from the topwall of the rear housing portion, and a rearwardly bowed backwall, and in conjoined relation, the sidewalls and topwall of the rear housing portion conjoined with the frontal housing portion in setback relation with the side edges and top edge, respectively, of the frontal housing portion;

a cylindrically-shaped optical scanning head mounted between the front and rear end pieces for rotational movement about an axis oriented substantially normal to the front side of the front housing portion;

a touch-sensitive display provided at the front side of the frontal housing portion for entering and displaying data;

a strap affixed to the backwall of the rear housing portion for engaging either hand of a user while gripping the sidewalls and backwall of the rear housing portion; and a pair of switch actuators portioned in spaced relation at respective shoulder regions where each sidewall conjoins with the topwall and backwall of the rear housing portion, whereby to accommodate convenient switch actuation by thumb and forefinger of the gripping hand.

16. A handheld data entry terminal comprising:

a housing;

a scanning head mounted to the housing for rotational movement between various reading positions, the scanner head containing components, when actuated, for optically scanning an encoded symbol and for detecting light reflected from the encoded symbol;

first and second trigger switches mounted by the housing;

data entry means mounted by the housing, the data entry means being a keypad including alphanumeric character entry keys and an alpha key for setting the keypad to either one of first and second character-type entry modes; and logic means responsive to inputs generated by at least one of the data entry means and the trigger switches to establish either one of the first and second trigger switches as a desired actuating switch for the scanning head components for a particular reading position to which the scanning head is positioned by an operator, the logic means including switch means for establishing the other one of the first and second trigger switches, that is not the established actuating switch for the scanning head components, as a keypad shift key effective, during actuation, to switch the keypad from the one of the first and second character-type entry modes set by the alpha key to the other of the first and second character-type entry modes, whereby to control the type of characters entered upon depression of the alphanumeric character entry keys.

* * * * *